July 15, 1969      G. J. CRITS      3,455,819

METHOD FOR SCRUBBING ION EXCHANGE RESINS

Filed April 1, 1968      2 Sheets—Sheet 1

INVENTOR
GEORGE J. CRITS

BY
ATTORNEYS

July 15, 1969  G. J. CRITS  3,455,819
METHOD FOR SCRUBBING ION EXCHANGE RESINS
Filed April 1, 1968  2 Sheets-Sheet 2

INVENTOR
GEORGE J. CRITS
BY
ATTORNEYS

United States Patent Office 3,455,819
Patented July 15, 1969

3,455,819
METHOD FOR SCRUBBING ION EXCHANGE RESINS
George John Crits, Havertown, Pa., assignor to Crane Co., Chicago, Ill., a corporation of Illinois
Filed Apr. 1, 1968, Ser. No. 717,864
Int. Cl. C02b 1/74; B01d 23/24
U.S. Cl. 210—32                                                5 Claims

ABSTRACT OF THE DISCLOSURE

Scrubbing of ion exchange resins is accomplished by expanding a bed thereof containing water by introducing air and rinsing by downflow of water while the bed is expanded. This is accomplished either by successive steps of air-expansion and of rapid rinsing, with repetition of these sequential steps, or by the continued introduction of air during rinsing so that the bed is continuously expanded to provide enlarged passages for the flow of the rinse water to carry foreign matter out of the bed.

Background of the invention

Ion exchange beds of various types accumulate foreign matter which must be removed, and particular reference may be made to condensate polishing in which special problems arise for the solution of which the present invention is particularly applicable. In this condensate polishing, either with mixed ion exchange resins or with sodium-cycle cation resins, the resins are utilized principally for filtering out metallic oxides (such as those of iron, copper, nickel, etc.), while they also function to remove by ion exchange soluble contaminants such as calcium, magnesium, sodium, etc.

Quite often the condensate polishing units have their usefulness terminated rather by reason of accumulation of these foreign materials or by reason of leakage of these from the bed rather than because of the attainment of a condition of ineffective ion exchange. The foreign materials have been cleaned out of the resins by vigorous air scrubbing followed by backwashing at restricted flow rates dependent primarily on the density of the resin particles. For cation resins, a typical rate of backwash flow is about 5 to 8 gallons per minute per square foot of cross-sectional area of the bed, while for anion resins the backwash rate is lower, at about 2 to 4 gallons per minute per square foot. This rate must be held down to prevent loss of resins by flotation out of the top of the ion exchange unit or by reason of not having sufficient freeboard in the tank to prevent carrying over of the resins. The backwash flow rate is critical in that variations of temperature of the backwash water can cause either loss of resin or insufficient backwash effectiveness. The low backwash rates are often too low to remove the heavy metal oxides. Much time is spent in backwashing at low flow rates to remove the foreign materials to the desired extent, and the amount of water used for backwash may be quite large. Time is the important matter in this backwashing and often 4 to 6 hours are required to effect the desired amount of cleaning.

A problem has also been involved in the separation of mixed resins when higher amounts of foreign materials are contained on the resin particles (beads). It has been customary to separate the resins and give the separated resins the scrubbing and backwashing treatments in their own tanks. For instance, the cation resin can be scrubbed and backwashed at higher flow rates and the anion resin can be scrubbed at lower flow rates but in a tank designed with higher freeboard. This old method is satisfactory with light loadings of foreign materials, for example, of the order of 10 to 60 grams per cubic foot of resin. But with various treatments involving long runs, the load of foreign materials may be 60 to 200 grams per cubic foot or even higher, and the old method required too much time and wash water and also risked excessive loss of valuable anion resin by reason of accidents in using too high a backwash rate and by air flotation of the resin. The prolonged air mixing time also involved more attrition than was desired.

Summary of the invention

In accordance with the present invention, backwashing is not used for the purpose of cleaning the resin (though it is used for other purposes as will later become apparent). Instead, the foreign matter is removed from the resin by downward flow of rinse water either following or concurrent with the introduction of air for the purpose of expanding a bed with resulting attrition and enlargement of the effective passages between the particles of the ion exchange material. When a bed is expanded by introduction of air, after the air is cut off there is a settling period during which the particles effectively have greater spacings through which flow may take place under conditions involving carrying the foreign materials downwardly through and out of the bed. With successive and repeated steps of introduction of air and downflow rinsing, effective cleaning results. In an alternative operation this same result is achieved because the bed is held expanded and agitated by the air while downflow of rinse water takes place to carry out the foreign materials. Various alternative operations are possible, and these will become clear from the following description. The objects of the invention are to accomplish cleaning with avoidance of the shortcomings involved in prior practices.

Description of the preferred embodiments

Figure 1:
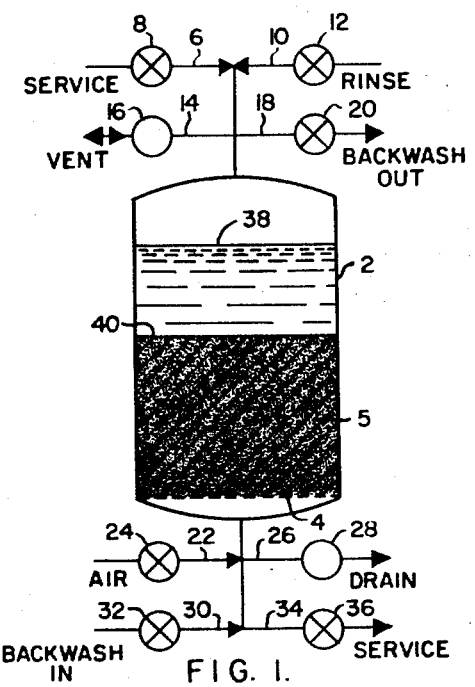
FIGURES 1, 2, 3 and 4 are diagrammatic views showing a typical apparatus and successive steps involved in removal of foreign materials in accordance with the present invention.

Referring first to FIGURES 1 to 4, inclusive, they illustrate ion exchange apparatus and its connections to the extent that these are involved in the present improvements. As will become evident, rejuvenation of the ion exchange material by regenerant solutions may be carried out in various ways which are conventional and depend upon the type of operation involved. There will first be described, therefore, the novel steps involved in carrying out the invention without specific reference to aspects of operation which are extraneous to the removal of foreign matter.

A tank 2 is provided with an underdrain or distributing assembly which is conventionalized at 4 as a screen supporting the bed 5 of ion exchange particles. The assembly 4 may take numerous conventional forms ranging from screen-like members through perforated or screened pipe assembles providing openings for effecting distribution of flow upwardly and reception of downwardly directed flow but preventing the escape of the particles of the ion exchange material which generally take the form of beads. The openings involved, for example, 40 to 100 mesh, equivalent to 100 to 150 micron openings, are, however, sufficiently large to pass readily the fine particles of the foreign material consisting, ordinarily, of metal oxides or other incidental dirt having particles sizes of less than 20 microns. The ion exchange material acts to a considerable extent as a filter so that the dirt is trapped in or coats the ion exchange material with uneven distribution of its concentration which as a service run proceeds is generally greater at the top of the bed than deeper therein when the flow of water is downward.

Communicating with the top of the tank are various lines for inflow and outflow of fluids. Those illustrated comprise the water service line 6 controlled by valve 8, a water rinse line 10 controlled by valve 12, air vent line 14 controlled by valve 16 and a backwash outlet line 18 controlled by valve 20.

At the bottom of the tank, communicating with the space below the assembly 4 are the air inlet line 22 controlled by valve 24, a drain line 26 controlled by valve 28, a backwash inflow line 30 controlled by valve 32 and a service line 34 controlled by valve 36.

To make clear the aspects of flow involved, the various figures show open valves as circles without interior markings while closed valves are indicated by circles containing crossed lines.

Various top and bottom connections concerned with flows of regenerating solutions are not illustrated, though it will be understood that these are suitably provided in conventional fashions. For purposes of initial description, it may be assumed that the bed 5 may be an anion exchange resin, a cation exchange resin, or a so-called mixed bed composed of both types of resins. It may also be assumed that the tank 2 is the tank in which the resin is located during on-stream operation, though it will become evident that the tank may be an auxiliary one into which resin is introduced only for the purpose of regeneration, the service tank being separate. During service flow, valves 8 and 36 will be open, the remaining valves being closed. Downflow during service will also be assumed, though upflow for service may be used as is conventional for some systems. During service flow the tank will be completely filled with water, the bed being compacted with its upper surface 40 substantially below the top of the tank, the bed being compacted by reason of the downflow.

FIGURE 1 illustrates the conditions existing at the end of the first step involved in accordance with the invention, during which step valves 16 and 28 are opened. The line 14 communicates with the atmosphere so that when the drain line 26 is open the level of water in the tank may drop, this condition being maintained until the upper surface of the water drops to a level such as 38 which may desirably be below the top of the tank to an extent approximately 25% of the freeboard distance above the top 40 of the bed, thus providing an air space above the level 38 sufficient to insure that resin will not be carried out during the next step of operation.

Figure 2:
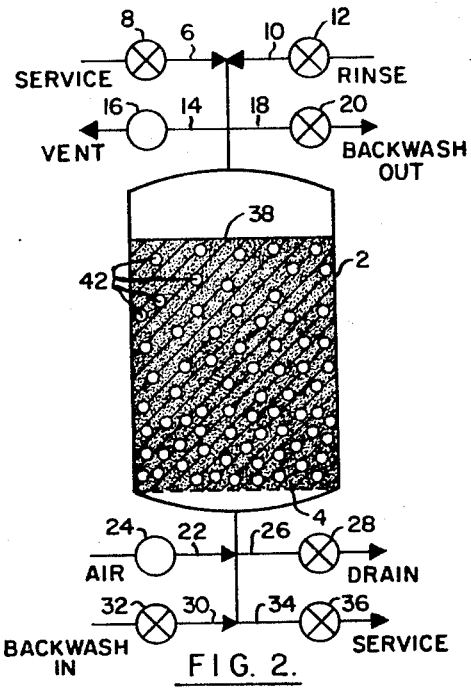

The foregoing condition being secured, the next step is that illustrated in FIGURE 2, in which valve 24 in the air line 22 and valve 16 in the vent line 14 are open, the remaining valves being closed. In this step air is introduced desirably at a rapid rate to produce bubbles 42 which rise through the material in the tank to exert a scrubbing action. This introduction of air expands the ion exchange bed so that the ion exchange material is distributed through the water up to and somewhat above the level 38, the air space, however, preventing the rise of liquid containing the ion exchange particles to such an extent as to result in accidental loss of the ion exchange material through the vent. Attrition resulting from the scrubbing action serves to remove deposits from the surfaces of the ion exchange particles, and at the same time breaks up any caking of the foreign matter and increases the porosity of the bed as a whole. The flow of air involved in this step may be maintained for any suitable time, one minute being typical.

While introduction of air has been, and will be referred to, any other gas may be used, this term being employed to include both gases and vapors. Nitrogen is desirable where introduction of oxygen is to be avoided because of its corrosive action in solution. Steam may be introduced as the scrubbing gas, in which case the bubbles will effect agitation even though ultimately condensed.

Figure 3:
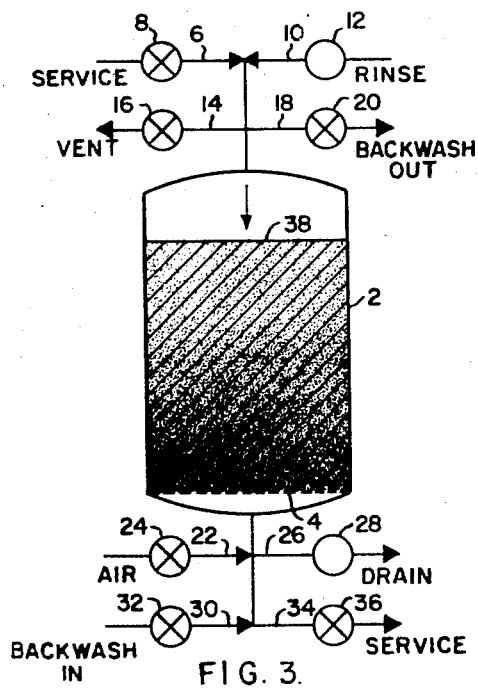

If at the end of this second step the air was cut off and substantial time permitted to elapse, the ion exchange particles would settle back approximately to their original position, though they would not be as greatly compacted as they were during service flow. However, substantially immediately after the air flow is cut off by closure of valves 24 and 16, the third step of operation in accordance with FIGURE 3 is effected by opening the rinse inlet valve 12 and the drain valve 28 to provide a rapid downflow of rinse water. By this step the downflow of rinse water takes place during the settling of the ion exchange particles, and while the downflow tends to accelerate the settling of the particles, before they become completely settled and compacted there is a substantial period of flow through the effectively enlarged spaces between them to carry downwardly through the outlet a considerable amount of water containing the foreign material in suspension so that a quite considerable portion thereof is driven outwardly during this step. The flow of rinse water may be typically carried out for about 2 minutes or less during a major portion of which this flushing out of the suspended foreign material is effected. There is no need to carry out this rinsing step to the extent of securing a clear effluent; in fact, it is ineffective and wasteful of time if it continues after the bed becomes reasonably compacted. The effectiveness of the operation is dependent upon repetition of the steps involved, not on long continued rinsing.

The removal of the foreign material during a single step as just described will, of course, be far from complete, and in accordance with the invention the second step (FIGURE 2) is repeated, again followed by the third step (FIGURE 3). Again, therefore, there is another scrubbing and bed expanding action followed by a rinse serving for further removal of the foreign material.

Steps 2 and 3 are rapidly carried out, the number of repetitions being dependent upon the extent of accumulation of the foreign matters during the on-stream operation of the system involved; but generally 10 to 40 repetitions of steps 2 and 3 will suffice to remove substantially all of the foreign material. For example, in the case of a condensate polisher operating sixty days between scrubbing and regenerating procedures, 30 repetitions may suffice; while if the procedure is carried out weekly only 10 repetitions are typically sufficient.

Figure 4:
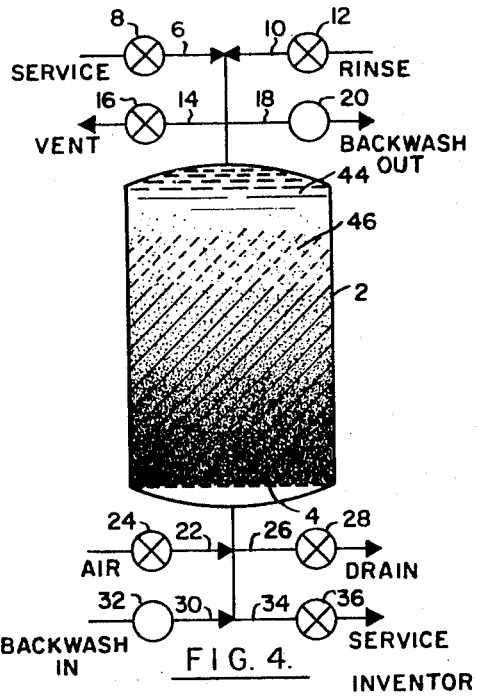

Following these repeated operations, various alternatives may be effected, of which FIGURE 4 merely illustrates one. The operation shown in FIGURE 4 is one of essentially conventional backwashing in which by opening of valves 32 and 20 upward backwash flow is provided to fill the tank. This backwash flow is at a relatively low rate so that the ion exchange particles are not carried through the outlet, the condition involved being that illustrated in which the upper portion of the tank is filled with water at 44 with the ion exchange particles rising only to some level such as indicated at 46, the bed being expanded. This backwashing step is particularly shown because due to the expansion of the bed and resulting agitation of the particles it is particularly useful in separating the cation and anion exchange resins of a mixed bed exchanger, the backwashing being carried out to provide separation because of the different specific gravities of the particles so that when the backwashing terminates the two resins will be stratified in preparation for regeneration.

The regeneration may be carried out in various conventional fashions. If the bed contains a single resin, anion or cation, the regeneration may be carried out in the vessel in which on-stream flow occurs. In the case of mixed bed exchangers, regenerations may occur with the two resins separated by stratification in the on-stream vessel, with suitable conduits provided for routing the regenerant flows, or one, or even both, of the resins may be removed to separate vessels for regeneration. The scrubbing may be carried out in such separate vessels if desired.

Furthermore, regeneration may precede scrubbing, rather than following it. Irrespective of the particular regeneration procedure the scrubbing in accordance with the invention may be utilized to remove the foreign materials.

Instead of the procedure above described, in which the air-expansion and agitation occurs alternately with the rinsing, the invention may involve simultaneous use of air for its purposes and rinsing. Such a procedure may involve the apparatus illustrated in FIGURE 5 in which the tank 50 contains the ion exchange material in suspension as indicated at 52, with air flowing upwardly therethrough. A distributing assembly is shown at 54 and may be as above described, involving openings which prevent the passage of the ion exchange particles while permitting outward flow of water containing the suspended foreign material. Located immediately above, or even interleaved with the assembly 54 there is an air distributor 56 which is conventionalized as a pipe distributing system having openings provided by perforations or screening which will prevent passage of the ion exchange particles but permit inflow of air from a line 58 controlled by a valve 60. For simplicity only two connections are shown at the top of the tank, a rinse water connection 62, controlled by valve 64, and an air vent 66 controlled by a valve 68. Other connections, not shown, would include the service inlet connection, a backwash outlet connection, and a regenerant feed connection, all suitably valved. The space below the distributing assembly 54 is connected to the outlet conduit 70 controlled by the valve 72. Additional connections here would be service connections, provisions for regenerant flow, a backwash inlet connection, etc. A level detector 74 is provided in this system for control of the liquid level at 75. The level 75 corresponds to that referred to in the first modification, being below the top of the tank to prevent possible loss of the exchange material. In order to maintain the air space above the level 75, the detector may control the vent valve 68 during the scrubbing operation, closing this valve when the level 75 rises above a predetermined position and opening the vent valve 68 when the level 75 drops abnormally. Instead of using a level control, valve openings may be preset so that flow rates of air and water will maintain the level 75 within proper limits.

In the operation of this system, following closure of the service connections, the liquid level may be dropped to the level 75 by drainage, with the vent open to atmosphere, as previously described, and then the scrubbing and rinsing action may proceed as follows:

With the air inlet valve 60 opened, the entering air is distributed by the distributor 56 to produce expansion of the bed to cause attrition of the particles to loosen the foreign materials and break up any caking theerof. Simultaneously, rinse water is introduced by opening the valve 64. The automatic control of the vent will keep the level 75 within proper limits. Rinse water will flow out through the open valve 72. By this arrangement scrubbing and rinsing take place simultaneously and the foreign material will be carried by the rinse water through the relatively large spaces between the suspended particles of the ion exchange material. This operation may be carried out as long as required for the cleaning of the material. If the openings of the distributor 56 are arranged to cause the air to flow in jets over the assembly 54, even the lowermost portions of the bed will be sufficiently agitated to produce proper scrubbing. For proper results, typical air injection may be of the order of 3 to 10 standard cubic feet per minute per square foot of cross-sectional area of the bed, and the downflow of rinse water may be typically at the rates of 2 to 10 gallons per minute per square foot of cross-sectional area of the bed. The time involved will, of course, depend on the extent and nature of the accumulation of foreign material.

As already described, the regeneration may be carried out in any suitable fashion either before or after the scrubbing operation.

Figure 5:
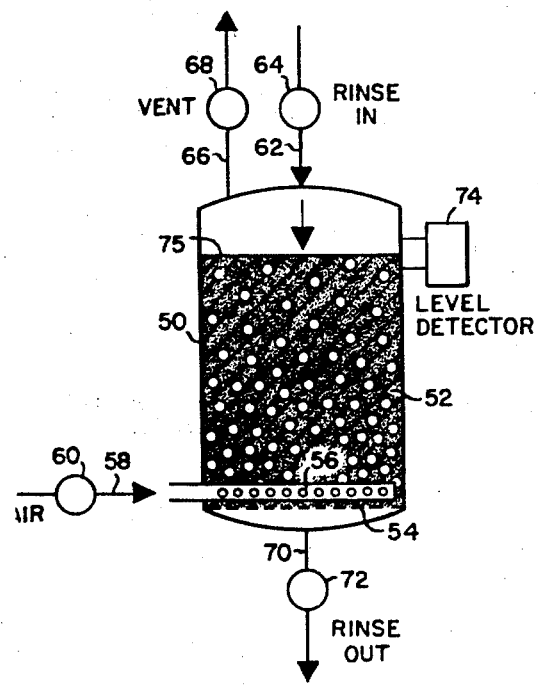
FIGURES 5 and 6 are similar diagrams illustrating alternative forms of apparatus and the operation thereof in accordance with the invention.
Figure 6:
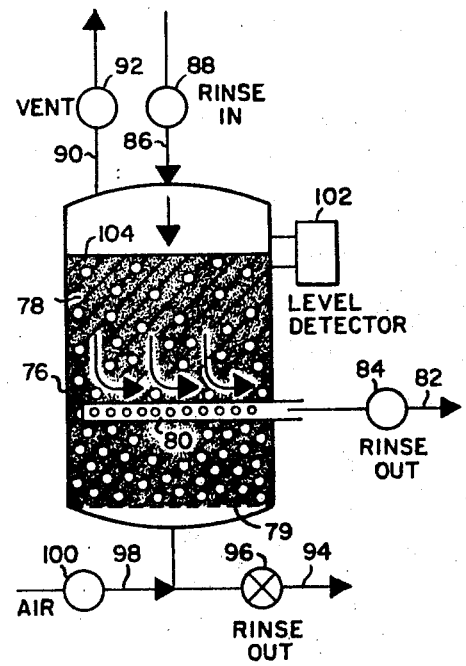

FIGURE 6 illustrates still another arrangement for carrying out the scrubbing and rinsing operation in a fashion closely resembling that involved in FIGURE 5 in that, at least to a major extent, the scrubbing and rinsing operation is carried out as a single continuous step rather than by way of repetitive cycles. The tank 76 contains, as illustrated, the expanded bed with water and air as indicated at 78. The distributor 79 adjacent to the bottom of the tank may be as already described. Above this, though it may be only slightly above, is a flow receiving arrangement which may comprise a pipe system indicated at 80 provided with openings or suitably screened to prevent outflow of the ion exchange material while permitting flow of water with the foreign material in suspension through its connection to the drain line 82 through a valve 84. Connections to the top of the tank are illustrated as in FIGURE 5, comprising the rinse inlet connection 86 controlled by valve 88, and the vent connection 90 controlled by the valve 92. Other connections at the top of the tank may be as already discussed.

At the bottom of the tank there are illustrated two connections, the rinse outlet connection 94 controlled by valve 96, and the air inlet connection 98 controlled by valve 100. Here also additional connections will be provided as already described.

A level detector 102 controls (if required) the level 104 during the scrubbing operation in suitable fashion, as by control of the vent valve 92 as described in connection with FIGURE 5.

After providing for a drop of the liquid level to 104 as previously described to avoid possible loss of ion exchange material, rinse water is caused to enter by opening of valve 88, and air is introduced through connection 98 by opening of valve 100 with the result that the air will be distributed uniformly across the entire lower portion of the tank. The inflowing air will expand the bed and produce cleaning attrition. The rinse water carrying the foreign material will flow outwardly through the assembly 80 and line 82 with valve 84 open. Because of the agitation produced by the air, the distribution of foreign material through the expanded bed will be, particularly after initial operation, substantially uniform, and the flowing rinse water will continuously carry out suspended foreign material. The foreign material from below the outlet 80 will be distributed above it so as to come into the path of the flowing rinse water. Rates of flow may be in the typical ranges discussed above with reference to FIGURE 5.

While under most conditions the cleaning will be quite effective, it may be augmented by utilizing the auxiliary rinse outlet connection at 94 controlled by the valve 96. This valve may be partially opened during the operation as described to provide a bleeding of water, possibly with some air, to carry out particularly such suspended foreign material as might be so dense as not to become distributed readily above the outlet 80. Alternatively, following a sufficiently long operation with the valve 96 closed, there may be produced several cyclical repetitions of the type described in connection with the first modification. By closing valve 84 and providing by suitable valve manipulations alternate air introduction and rinsing, with valve 96 open during the latter, completely effective removal of the final portions of the foreign material may be effected. The advantage of the arrangement just described is that a somewhat freer flow of rinse water is provided since even with considerable agitation by the air the concentration of ion exchange particles tends to increase by settling from the top of the expanded bed to the lower portions thereof, and in this modification rinse water flows only through the region where the lesser concentration of ion exchange particles exists. Otherwise, what is illustrated in FIGURE 6 has an operation similar to that of FIGURE 5.

What is claimed is:

1. A method for scrubbing ion exchange granules to remove therefrom accumulated foreign material comprising introducing a gas into the bottom portion of a water-containing bed of said ion exchange granules to effect agitation and expansion of the granules to open up the effective flow passages between them, and providing a dowwnard flow of rinse water through the expanded granules to flush out the foreign material.

2. A method according to claim 1 in which the introduction of gas and rinsing occur in successive steps, the rinsing being carried out while the granules are still expanded prior to completion of settling.

3. A method according to claim 2 in which said successive steps are repeated after substantial settling of the granules.

4. A method according to claim 1 in which the introduction of gas and the rinsing are carried out simultaneously.

5. A method according to claim 4 in which the rinsing is carried out through the upper portion of the expanded bed with the rinse water carrying the foreign material being removed at a level above the bottom of the bed.

References Cited
UNITED STATES PATENTS

| | | | |
|---|---|---|---|
| 595,182 | 12/1897 | Lardner et al. | 210—274 |
| 2,771,424 | 11/1956 | Stromquist et al. | 210—35 X |
| 3,151,070 | 9/1964 | Corte | 210—190 |

SAMIH N. ZAHARNA, Primary Examiner

U.S. Cl. X.R.

210—80, 274